United States Patent [19]

Lagnemo et al.

[11] Patent Number: 5,902,783
[45] Date of Patent: *May 11, 1999

[54] BLEACHING AGENT

[75] Inventors: Hans Lagnemo, Göteborg; Monica Jigstam, Torslanda, both of Sweden

[73] Assignee: Eka Chemicals AB, Bohus, Sweden

[*] Notice: This patent is subject to a terminal disclaimer.

[21] Appl. No.: 08/700,384

[22] PCT Filed: Oct. 7, 1994

[86] PCT No.: PCT/SE94/00943

§ 371 Date: Aug. 23, 1996

§ 102(e) Date: Aug. 23, 1996

[87] PCT Pub. No.: WO95/23208

PCT Pub. Date: Aug. 31, 1995

[30] Foreign Application Priority Data

Feb. 25, 1994 [SE] Sweden .................................. 9400653

[51] Int. Cl.$^6$ ................................ C11D 3/39; D06L 3/02; C01B 15/10

[52] U.S. Cl. .................... 510/375; 8/111; 252/186.27; 252/186.28; 252/186.32; 252/186.43

[58] Field of Search .................... 252/186.28, 186.33, 252/186.43; 8/111; 510/375, 378

[56] References Cited

U.S. PATENT DOCUMENTS

| | | |
|---|---|---|
| 3,975,280 | 8/1976 | Hachmann et al. . |
| 3,977,988 | 8/1976 | Tokiwa et al. . |
| 4,075,116 | 2/1978 | Mesaros . |
| 4,117,087 | 9/1978 | Dillenburg et al. . |
| 5,340,496 | 8/1994 | Sato et al. . |

FOREIGN PATENT DOCUMENTS

| | | |
|---|---|---|
| 459625 | 12/1991 | European Pat. Off. . |
| 546815 | 6/1993 | European Pat. Off. . |
| 573731 | 12/1993 | European Pat. Off. . |
| 53-959 | 1/1978 | Japan . |
| 54-128488 | 10/1979 | Japan . |
| 58-74508 | 5/1983 | Japan . |
| 59-193999 | 11/1984 | Japan . |
| 659082 | 12/1986 | Switzerland . |
| 1575792 | 1/1978 | United Kingdom . |
| 2016540 | 9/1979 | United Kingdom . |
| 1579513 | 11/1980 | United Kingdom . |
| 9115423 | 10/1991 | WIPO . |
| 9518065 | 7/1995 | WIPO . |

OTHER PUBLICATIONS

Römpps Chemie—Lexikon, Upplaga 8, Band 2, 1981 p. 1503 "Glucosaure", 1981.

Kirk–Othmer Encyclopedia of Chemical Technology, Third Edition, vol. 5, p. 344.

*Primary Examiner*—Margaret Einsmann
*Attorney, Agent, or Firm*—McDermott, Will & Emery

[57] ABSTRACT

The invention relates to particles having a core comprising a peroxy compound with capability of releasing hydrogen peroxide or peroxy acids in aqueous solutions, which particles have a coating containing alkali metal silicate and a chelating agent. The invention also relates to preparation and use of the particles as well as a composition containing such particles.

12 Claims, No Drawings

BLEACHING AGENT

The present invention relates to particles having a core of a peroxy compound and a coating comprising alkali metal silicate and a chelating agent. The invention also relates to preparation and use of the particles. Further, the invention relates to a composition containing such coated particles.

Powder detergent compositions often contain peroxy compounds as bleaching agents which release hydrogen peroxide or peroxy acids in aqueous solutions. However, many peroxy compounds are not storage stable. Their decomposition is supposed to be catalysed by metal cations moving comparatively freely through the water normally being present in detergents, but is also facilitated by the alkaline pH (normally from about 8 to about 12) and by other components commonly present in detergents, for example zeolites or bleaching activators such as TAED (tetraacetylethylene diamine), TAGU (tetraacetylglucoluril) or PAG (penta acetyl glucose).

In order to make environmental friendly detergents, it is desirable to use alkali metal carbonate peroxy hydrate, commonly known as percarbonate, as a bleaching agent. However, the activity of percarbonate in a detergent decreases rapidly through decomposition if the detergent is stored at normal room temperature and humidity.

Many attempts to stabilize percarbonate have been done, for example by mixing or coating with stabilizing substances such as borates, silicates or organic substances. Such stabilizing methods are described in the patent literature, for example in GB 1575792, EP 459625, U.S. Pat. No. 3975280 and EP 573731.

It has also been disclosed to combine percarbonate with chelating agents such as alkali metal citrate (see EP 546815) or phosphonic acids (see WO 91/15423).

CH 659082 describes a detergent additive comprising a mixture of a peroxide, an inorganic carbonate and an acid or its salt that is solid at room temperature.

U.S. Pat. No. 4075116 discloses a method of preparing sodium percarbonate from sodium carbonate and hydrogen peroxide, which method includes adding a compound selected from sodium sulfate, potassium sulfate, sodium pyrophosphate, potassium pyrophosphate, sodium metasilicate, sodium disilicate, sodium citrate, sodium glucoheptonate, sodium perborate, anhydrous sodium carbonate, potassium carbonate and mixed sodium and potassium carbonate. However, the patent is not addressed towards stabilization of previously prepared sodium percarbonate or to the inhibition of the other constituents of detergent mixtures containing percarbonate.

U.S. Pat. No. 4117087 discloses a method of preparing sodium percarbonate from sodium carbonate and hydrogen peroxide including addition of alkali metal silicate. Phosphonic acids, EDTA (ethylenediamine tetraacetic acid) or NTA (nitrilotriacetic acid) may be added to the hydrogen peroxide which is prepared for the precipitation of percarbonate.

The object of the present invention is to provide particles comprising a peroxy compound, particularly alkali metal percarbonate, with improved storage stability, particularly in detergent compositions. It is another object of the invention to provide particles comprising a peroxy compound only containing environmental friendly constituents.

Through the present invention, these objects has been fulfilled by providing particles having a core of a peroxy compound with capability of releasing hydrogen peroxide or peroxy acids in aqueous solutions, particularly in alkaline solutions. The particles have a coating containing alkali metal silicate and a chelating agent. Suitably, the coating contains an aliphatic organic compound as a chelating agent, the organic compound preferably comprising from 2 to 10 carbon atoms, most preferably from 4 to 8 carbon atoms. It is preferred to substantially exclude chelating agents containing phosphor such as phosphonic acid or salts thereof. It is also preferred to substantially exclude chelating agents which are not easily bio-degradable such as EDTA or DTPA (diethylene triamine pentaacetic acid, or chelating which for other reasons are questionable from an environmental point of view such as NTA.

It has surprisingly been found that the combination of alkali metal silicate and chelating agents shows a synergistic effect of stabilising peroxy compounds when both are included in a coating around particles containing said peroxy compound. It has also been found that the chelating agent and the alkali metal silicate is much more effective when it is applied as a coating then if it is mixed in the core. However, the most effective stabilization occurs when also the core contains a chelating agent and/or alkali metal silicate. The particles may comprise one ore several layers of coating containing alkali metal silicate and a chelating agent. The particles may also comprise layers not containing chelating agents or alkali metal silicate.

The invention is particularly advantageous if the peroxy compound is alkali metal percarbonate, but also other peroxy compounds can be stabilized, for example alkali metal salts of perborates, peroxysulfates, peroxyphosphate, or peroxysilicatese peroxycarboxylic acids or peroxycarboxylic acid releasing compounds such as di-acylated di-peroxy carboxylic acids (see WO 91/17143). The particles preferably contains from about 10 to about 99% by weight, most preferably from about 50 to about 95% by weight of a peroxy compound, and from about 0.1 to about 20% by weight, most preferably from about 0.5 to about 15% by weight of a chelating agent. It is particularly preferred that the chelating agent in the coating constitutes from about 0.1 to about 15% by weight, most preferably from about 0.5 to about 10% by weight of the particle, and that the optional chelating agent in the core constitutes from about 0.1 to about 10% by weight, most preferably from about 0.2 to about 5% by weight of the particle. Preferably from about 50 to about 100% by weight of the total amount of the chelating agent is in the coating of the particle.

It is preferred that the alkali metal silicate in the coating constitutes from about 0.1 to about 10% by weight of the particle, most preferably from about 0.5 to about 5% by weight of the particle. It is also preferred that the optional alkali metal silicate in the core constitutes from about 0.1 to about 10% by weight of the particle, most preferably from about 0.5 to about 7% by weight of the particle.

The stabilizing effect has been found to be particularly good if the molar ratio $SiO_2:M_2O$, M being an alkali metal, is from 1 to 3, especially from 1 to 2.5. The alkali metal is preferably sodium, potassium or mixtures thereof.

The organic compound used as a chelating agent preferably comprises at least one hydroxyl group and/or at least one carboxylic acid group, most preferably two or more carboxylic acid groups or at least one carboxylic acid group and at least one hydroxyl group. In the case of one or more carboxylic acid groups being present, it is preferred to use alkali metal or alkaline earth metal salts of the acid. Alkali metals are preferably selected from sodium, potassium or mixtures thereof, and alkaline earth metals are preferably selected from calcium, magnesium or mixtures thereof. Sodium salts are particularly preferred.

One group of preferred chelating agents are salts of hydroxy carboxylic acids comprising one or several hydroxyl groups and one, two or three carboxylic acid groups. Another group of preferred chelating agents are salts of di-carboxylic acids. The most preferred chelating agents are salts of compounds satisfying the general formula:

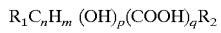

in which n=1–8, m=1–2n, p=0–n, q=0–2 and at least one of $R_1$ or $R_2$ is COOH and the other one is OH or COOH.

Examples of useful chelating agents are the following compounds or salts thereof: 2-pentenedioic acid, 2-(3-carboxy-1-oxopropoxy)-3-hydroxy-butanedioic acid, glucoheptonic acid, α-glucoheptonic acid, glutaric acid, acid, carboxy methoxy succinic acid, glycerin monocitrate, 2,5-diethyl adipic acid, 3-tert-butyl-hexanedioic acid, oxydisuccinic acid, 2-butenedioxid acid, hydroxy-butanedioic acid, 2-ethylsuberic acid, tartaric acid, paratartaric acid, pyrotartaric acid, dihydroxy tartaric acid, heptonic acid, oxalosuccinic acid, carboxy succinic acid, 3-oxo-glutaric acid, galactaric acid, gluconic acid, dihydroxy-maleic acid, cork acid, aconitic acid, methylmaleic acid, glutaric acid, 2-oxo-glutaric acid, oxalocitric acid, citric acid, isocitric acid, adipic acid, c pimelic acid, glycolic acid, diglycolic acid, fumaric acid, 2-butenedioic acid, succinic acid, methylene-succinic acid, 1,2,3-tricarboxy propane, saccharic acid, ascorbic acid, 2-hydroxymethyl-crotonic acid, glyceric acid, hydroxy-pivalic acid, dimethylol-propionic acid, malonic acid, methyl-malonic acid, ethylene malonic acid, methylene malonic acid, (ethyleneoxy) di-malonic acid, hydracrylic acid, 2-methyl-hydracrylic acid, 3-hydroxy-propionic acid, hydroxy-pyruvic acid, (carboxymethyl) malonic acid, ethylmalonic acid, dimethyl malonic acid, 2-methyl malonic acid, hydroxy-malonic acid, ethylene lactic acid, mesoxalic acid and glycerolic acid.

Also chelating agents selected among amino acids or salts thereof may be used, for example 2-amino-1,1,2-ethanetricarboxylic acid, aspartic acid, 2-(hydroxymethyl)-aspartic acid, aminomethyl propanedioic acid, β-alanine diacetic acid, serine, glycineserine, 2-methyl-serine, N-methyl-serine, 2-aminomalonic acid, N-hydroxyimino diacetic acid, N-(carboxymethyl)maleamic acid, N-(carboxymethyl)glutamic acid, N-(carboxymethyl) aspartic acid, N-(2-hydroxyethyl)sarcosine, iminodisuccinic acid, 3-bis(carboxymethyl)amino)propionic acid, N-(hydroxyethyl)glycine, N-ethyliminodiacetic acid, methyliminodiacetic acid, nitrilotris(propionic acid), 3,3'-iminodipropionic acid, diethanol glycine, diglycine, triglycine, ethanolamine-N,N-diacetic acid, glutamic acid and aspartic acid.

Particularly preferred chelating agents are selected from the group consisting of salts of citric acid, gluconic acid, glucoheptonic acid, saccharic acid, glutaric acid and pimelic acid.

It is to be understood that the particles may include two or more different chelating agents as described herein.

It has also been found favourable if the core of the particles contain anhydrous alkali metal carbonate, particularly sodium carbonate, (commonly known as soda ash), suitably in an amount from about 1 to about 50% by weight, preferably from about 5 to about 30% by weight of the particle. It is also possible to include other substantially inert substances such as sulfates of alkali metals.

Suitably, the particles have an average diameter from about 50 to about 3000 μm, preferably from about 100 to about 1250 μm. The preferred density is from about 600 to about 1500 g/l, particularly from about 800 to about 1100 g/l. It has been found that a high density as well as a high average particle size improves the storage stability.

The invention also concerns a method of preparing particles according to the invention, which method comprises the steps of applying a coating on particles comprising a peroxy compound with capability of releasing hydrogen peroxide or peroxy acids in aqueous solutions, which coating contains alkali metal silicate and a chelating agent. The coating may applied in the form of an aqueous solution of alkali metal silicate containing a chelating agent by conventional methods such as spraying in drums or fluidized beds. The particles to be coated which comprise the peroxy compound, may also contain a chelating agent and/or alkali metal silicate. Such particles may for example be prepared from fine particles mainly consisting of a peroxy compound, preferably with a particle diameter less than about 200 μm, adding a chelating agent and/or alkali metal silicate and/or other optional ingredients, and granulating the mixture to obtain particles of a suitable size, which particles then can be coated. Granulation may be performed by conventional methods well known among those skilled in the art, such as compacting, extruding, agglomeration in drum or disk, fluid-bed granulation, prilling or in different kinds of mixers. A chelating agent, alkali metal silicate and other optional ingredients can also be included directly when, for example, alkali metal percarbonate is produced from alkali metal carbonate and hydrogen peroxide. Alkali metal silicate is preferably added in the form of an aqueous solution, and the chelating agent is preferably mixed therein before addition to the peroxy compound.

Regarding preferred peroxy compounds, chelating agents, alkali metal silicate and other components, as well as suitable amounts thereof, the above description of the particles according to the invention is referred to.

The invention further concerns use of the described particles comprising a peroxy compound, alkali metal silicate and a chelating agent as a bleaching agent, preferably in connection with washing of textiles or dishwashing. The washing water may be supplied with particles according to the invention being included in a detergent composition or being in the form of a separate bleaching powder. Preferably., washing water is supplied with particles in an amount so to obtain from about 0.001 to about 1 gram active oxygen per liter, which for example corresponds to from about 0.01 to about 6 grams sodium percarbonate.

Finally, the invention concerns a composition containing an inert filler, and/or one or several substances active at washing, which composition further contains particles comprising a peroxy compound, alkali metal silicate and a chelating agent according to the invention, for example in an amount from about 1 up to about almost 100% by weight. The composition may comprise a mixture of particles containing different kinds of peroxy compounds. The substances active at washing may include detergent builders, surfactants, alkali generating substances, bleaching activators, or any other substances commonly used in detergents. The detergent builder may for example be selected from phosphates, zeolites, polycarboxylates, citrates, crystalline disilicates, amorphous disilicates (e.g. Britesil™), or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alcohol-ethoxysulfates or alpha-olefine sulfonates. Nonionic surfactants may for example be selected from alkoxylated compounds such as fatty alcohols, alkylphenols and alkylamines. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from TAED, TAGU, SNOBS (sodium nonoyl benzene sulfonate)e PAG (penta acetyl glucose) or diacylated diperoxy carboxylic acids (see WO 91/17143). The filler may include any inert substance such as sodium sulfate. The composition may constitute a complete detergent or a bleaching powder to be added separately at washing.

A complete detergent for washing of textiles suitably contains from about 1 to about 30% by weight, preferably from about 10 to about 20% by weight of particles according to the invention. Further, the detergent suitably contains a detergent builder, for example from about 5 to about 50% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5 by weight of soaps. The detergent may also contain bleaching activators, for example from about 1 to about 10% by weight, and fillers such as sodium sulfate, for example from about 5 to about 50% by weight. Although not preferred from an environmental point of view, it is possible to include chelating agents such as phosphonates or EDTA, for example in an amount from about 0.1 to about 1% by weight. Additionally, the detergent may contain conventional components such as water glass, carboxy methyl cellulose, enzymes, foam regulators, perfumes, colouring agents, optical brighteners and water. The detergent can be prepared with conventional methods such as dry mixing, agglomeration or spray drying. If the preparation involves spray drying, any heat sensible component such as particles comprising peroxy compounds, enzymes and perfumes should be added to the dried material.

A separate bleaching powder may comprise up to almost 100% by weight of particles containing peroxy compounds according to the invention, but preferably the content is from about 5 to about 90% by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated dipercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15§ by weight of a bleaching agent comprising coated particles according to the invention, such as coated sodium percarbonate, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP), from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 80% by weight of alkali metal metasilicate and the builder preferably substantially consisting of STPP.

The present invention makes it possible to prepare stable bleaching agents comprising peroxy compounds, particularly percarbonate, which may be used in detergents including zeolites such as zeolite 4A. The invention also makes it possible to decrease or exclude the use of other chelating agents in detergents, such as the commonly used EDTA or phosphonates which are less suitable from an environmental point of view.

The invention will now be described through the following examples which, however, not are intended to limit the scope of the invention. If not otherwise stated, all contents an percentages refer to content and percent by weight.

EXAMPLE 1: Sodium percarbonate particles with a diameter of about 200–1250 lm and a density of about 1000 g/l were coated with aqueous sodium disilicate solution and with different chelating agents by spraying in a rotating drum and drying in a fluidized bed. Particles for comparison were prepared by coating with sodium disilicate only and with chelating agents only. In order to test the storage stability of the percarbonate, the prepared particles as well as uncoated particles were included in a standard detergent IEC-Z (Henkel) consisting of 9.7% linear alkyl benzenesulfonate ($C_{average}$11.5), 5.2% ethoxylated $C_{12-18}$alcohol (EO$_7$), 3.6% sodium-soap, 32.5% zeolite A, 13.0% sodium carbonate, 5.2% sodium salt of copolymerisate of acrylic- and maleic acid (CP$_5$), 3.9% sodium waterglass (ratio 3.3), 1.3% carboxy methyl cellulose, 0.3% EDTA, 0.3% optical brightener (stilbene type), 24.4% sodium sulfate, water and foam regulator, 0.6% enzyme prills protease (activity 300.00). Samples were prepared from 64 grams IEC-Z, 12 grams percarbonate particles and 4 grams TAED. A Quick Stability Index (QSI) was determined for each sample by measuring the amount of oxygen formed during 24 hours storage at 40° C. and dividing the amount of oxygen liberated by the relative content (%) of active oxygen in the original percarbonate. Thus, a low QSI-value means high stability. The QSI-values for the particles with different coating compositions are shown in the table below, in which the contents of the different constituents refer to % by weight based on the entire particle. Although the chelating agents are named as acids, the actual agents used were sodium salts of said acids. The abbreviation "Chel" refer to chelating agent and "DS" refer to sodium disilicate,

| | QSI-value | | | | |
|---|---|---|---|---|---|
| Chelating agent | 5% Chel + 2% DS | 5% Chel | 5% DS | 7% DS | No coating |
| no Chel | | | | | 2.8 |
| no Chel | | | 0.7 | | |
| no Chel | | | | 0.7 | |
| glutaric acid | 0.06 | 0.08 | | | |
| pimelic acid | 0.2 | 0.7 | | | |

-continued

| | QSI-value | | | | |
|---|---|---|---|---|---|
| Chelating agent | 5% Chel + 2% DS | 5% Chel | 5% DS | 7% DS | No coating |
| citric acid | 0.4 | 2 | | | |
| gluconic acid | 0.2 | 1.2 | | | |
| glucoheptonic acid | 0.1 | 0.2 | | | |
| saccharic acid | 0.5 | 1.4 | | | |

We claim:

1. Particles having a core comprising a peroxy compound with capability of releasing hydrogen peroxide or peroxy acids in aqueous solutions, wherein the particles have a coating containing alkali metal silicate and an aliphatic organic compound or a salt thereof as a chelating agent, wherein said organic compound comprises from 2 to 10 carbon atoms and one or more carboxylic acid groups.

2. Particles as claimed in claim 1, wherein the coating contains an alkali metal salt or an alkaline earth metal salt of the organic compound.

3. Particles as claimed in claim 1, wherein the organic compound comprises from 4 to 8 carbon atoms.

4. Particles as claimed in claim 1, wherein the organic compound comprises two or more carboxylic acid groups or at least one carboxylic acid group and at least one hydroxyl group.

5. Particles as claimed in claim 1, wherein the organic compound satisfies the formula:

$$R_1C_nH_m(OH)_p(COOH)_qR_2$$

in which $n=1-8$, $m=1-2n$, $p=0-n$, $q=0-2$ and at least one of $R_1$ and $R_2$ is COOH and the other one is OH or COOH.

6. Particles as claimed in claim 5, wherein the chelating agent is selected from the group consisting of salts of citric acid, gluconic acid, glucoheptonic acid, saccharic acid, glutaric acid and pimelic acid.

7. Particles as claimed in claim 1, wherein the alkali metal silicate in the coating constitutes from 0.1 to 10% by weight of the particle.

8. Particles as claimed in claim 1, wherein the molar ratio $SiO_2:M_2O$, M being an alkali metal, is from 1 to about 2.5.

9. Particles as claimed in claim 1, wherein the peroxy compound is alkali metal percarbonate.

10. A method of preparing particles, comprising applying a coating on particles of a peroxy compound with capability of releasing hydrogen peroxide or peroxy acids in aqueous solutions, said coating containing alkali metal silicate and an aliphatic organic compound or a salt thereof as a chelating agent, wherein said organic compound comprises from 2 to 10 carbon atoms and one or more carboxylic acid groups.

11. A method for bleaching an article, comprising contacting the article with an aqueous solution containing the particles of claim 1.

12. A composition comprising the particles of claim 1, and at least one of an inert filler or one or more substances active at washing.

* * * * *